(12) United States Patent
Lee et al.

(10) Patent No.: US 12,117,932 B2
(45) Date of Patent: *Oct. 15, 2024

(54) METHOD AND APPARATUS FOR PERFORMING DATA ACCESS MANAGEMENT OF MEMORY DEVICE IN PREDETERMINED COMMUNICATIONS ARCHITECTURE WITH AID OF UNBALANCED TABLE UPDATE

(71) Applicant: Silicon Motion, Inc., Hsinchu County (TW)

(72) Inventors: Jie-Hao Lee, Hsinchu County (TW); Chien-Cheng Lin, Yilan County (TW); Chang-Chieh Huang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,402

(22) Filed: Jan. 9, 2023

(65) Prior Publication Data
US 2024/0232074 A1    Jul. 11, 2024

(51) Int. Cl.
G06F 12/02    (2006.01)
(52) U.S. Cl.
CPC ...... G06F 12/0292 (2013.01); G06F 12/0246 (2013.01); G06F 12/0253 (2013.01); *G06F 2212/7201* (2013.01)
(58) Field of Classification Search
CPC ......... G06F 12/0246; G06F 2212/7201; G06F 12/0253; G06F 12/0292; G06F 3/061;
(Continued)

(56) References Cited

U.S. PATENT DOCUMENTS

2016/0011971 A1    1/2016   Lee
2016/0188410 A1    6/2016   Lee
(Continued)

FOREIGN PATENT DOCUMENTS

CN    104133779 A    11/2014
CN    111966611 A    11/2020
(Continued)

OTHER PUBLICATIONS

Lee, the specification, including the claims, and drawings in the U.S. Appl. No. 18/094,396, filed Jan. 9, 2023.
(Continued)

*Primary Examiner* — Hua J Song
(74) *Attorney, Agent, or Firm* — Winston Hsu

(57) ABSTRACT

A method for performing data access management of a memory device in a predetermined communications architecture with aid of unbalanced table update and associated apparatus are provided. The method may include: utilizing a memory controller to receive a plurality of host commands from a host device through a transmission interface circuit of the memory controller, receive a set of first data and a set of second data with first and second active blocks according to first and second commands among the host commands, respectively, and update first and second temporary physical-to-logical (P2L) address mapping tables; and in response to a table region of any temporary P2L address mapping table being full, updating a first P2L address mapping table according to the first temporary P2L address mapping table and selectively updating a second P2L address mapping table according to the second temporary P2L address mapping table, for performing subsequent processing.

17 Claims, 8 Drawing Sheets

(58) Field of Classification Search
CPC ............... G06F 3/0659; G06F 3/0679; G06F 2212/1016; G06F 2212/7205
USPC ..................................................... 711/154
See application file for complete search history.

(56) References Cited

U.S. PATENT DOCUMENTS

| | | |
|---|---|---|
| 2016/0371019 A1 | 12/2016 | Kang |
| 2018/0356997 A1 | 12/2018 | Gorobets |
| 2019/0220392 A1 | 7/2019 | Lin |
| 2021/0303463 A1 | 9/2021 | Gorobets |

FOREIGN PATENT DOCUMENTS

| | | |
|---|---|---|
| TW | I293729 | 2/2008 |
| TW | 201305817 A1 | 2/2013 |
| TW | I420298 B | 12/2013 |
| TW | I640016 B | 11/2018 |
| TW | 201915747 A | 4/2019 |
| TW | I661303 B | 6/2019 |
| TW | 202032377 A | 9/2020 |
| TW | I748410 B | 12/2021 |
| TW | 202230123 A | 8/2022 |

OTHER PUBLICATIONS

Lee, the specification, including the claims, and drawings in the U.S. Appl. No. 18/094,401, filed Jan. 9, 2023.

METHOD AND APPARATUS FOR PERFORMING DATA ACCESS MANAGEMENT OF MEMORY DEVICE IN PREDETERMINED COMMUNICATIONS ARCHITECTURE WITH AID OF UNBALANCED TABLE UPDATE

BACKGROUND OF THE INVENTION

1. Field of the Invention

The present invention is related to memory control, and more particularly, to a method and apparatus for performing data access management of a memory device in a predetermined communications architecture with aid of unbalanced table update.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. As system files may be frequently accessed, some data may become invalid data. When the invalid data and some valid data are mixed together at the same storage block within the memory device, it is typically needed to perform garbage collection (GC) to release more storage space for further use, causing write amplification to be increased. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access management of a memory device in a predetermined communications architecture (e.g., a UFS communications architecture) with aid of unbalanced table update, in order to solve the above-mentioned problems.

At least one embodiment of the present invention provides a method for performing data access management of a memory device in a predetermined communications architecture with aid of unbalanced table update, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: utilizing the memory controller to receive a plurality of host commands from a host device through a transmission interface circuit of the memory controller, receive a set of first data and a set of second data with a first active block and a second active block among the plurality of blocks according to a set of first commands and a set of second commands among the plurality of host commands, respectively, and update a first temporary physical-to-logical (P2L) address mapping table corresponding to the first active block and a second temporary P2L address mapping table corresponding to the second active block, wherein the set of first commands and the set of second commands indicate that writing the set of first data into the memory device and writing the set of second data into the memory device are requested, respectively; and in response to a table region of any temporary P2L address mapping table among the first temporary P2L address mapping table and the second temporary P2L address mapping table being full, updating a first P2L address mapping table in the NV memory according to the first temporary P2L address mapping table and selectively updating a second P2L address mapping table in the NV memory according to the second temporary P2L address mapping table, for performing subsequent processing, wherein the first temporary P2L address mapping table and the second temporary P2L address mapping table are arranged to occupy a first table region of a first size and a second table region of a second size in a Random Access Memory (RAM) within the memory controller, respectively.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform data access management of the memory device in a predetermined communications architecture with aid of unbalanced table update. The memory controller further comprises a transmission interface circuit, and the transmission interface circuit is arranged to perform communications with the host device. For example, the memory controller receives the plurality of host commands from the host device through the transmission interface circuit of the memory controller, receives a set of first data and a set of second data with a first active block and a second active block among the plurality of blocks according to a set of first commands and a set of second commands among the plurality of host commands, respectively, and updates a first temporary P2L address mapping table corresponding to the first active block and a second temporary P2L address mapping table corresponding to the second active block, wherein the set of first commands and the set of second commands indicate that writing the set of first data into the memory device and writing the set of second data into the memory device are requested, respectively; and in response to a table region of any temporary P2L address mapping table among the first temporary P2L address mapping table and the second temporary P2L address mapping table being full, the memory controller updates a first P2L address mapping table in the NV memory according to the first temporary P2L address mapping table and selectively updates a second P2L address mapping table in the NV memory according to the second temporary P2L address mapping table, for performing subsequent processing, wherein the first temporary P2L address mapping table and the second temporary P2L address mapping table are arranged to occupy a first table region of a first size and a second table region of a second size in a Random Access Memory (RAM) within the memory controller, respectively.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In order to correct the related art problems, it is suggested that the memory device may operate according to at least one control scheme (e.g., one or more control schemes) of the method to perform associated operations, and more particularly, use unbalanced temporarily address mapping tables (e.g., the temporarily address mapping tables occupying table regions of different sizes, respectively) in a volatile memory within the memory controller to manage data flows during data reception.

The present invention method and apparatus can guarantee that the memory device can operate properly in various situations. For example, the memory device can perform data reception with multiple active blocks and manage the multiple active blocks with the unbalanced temporarily address mapping tables to enhance overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
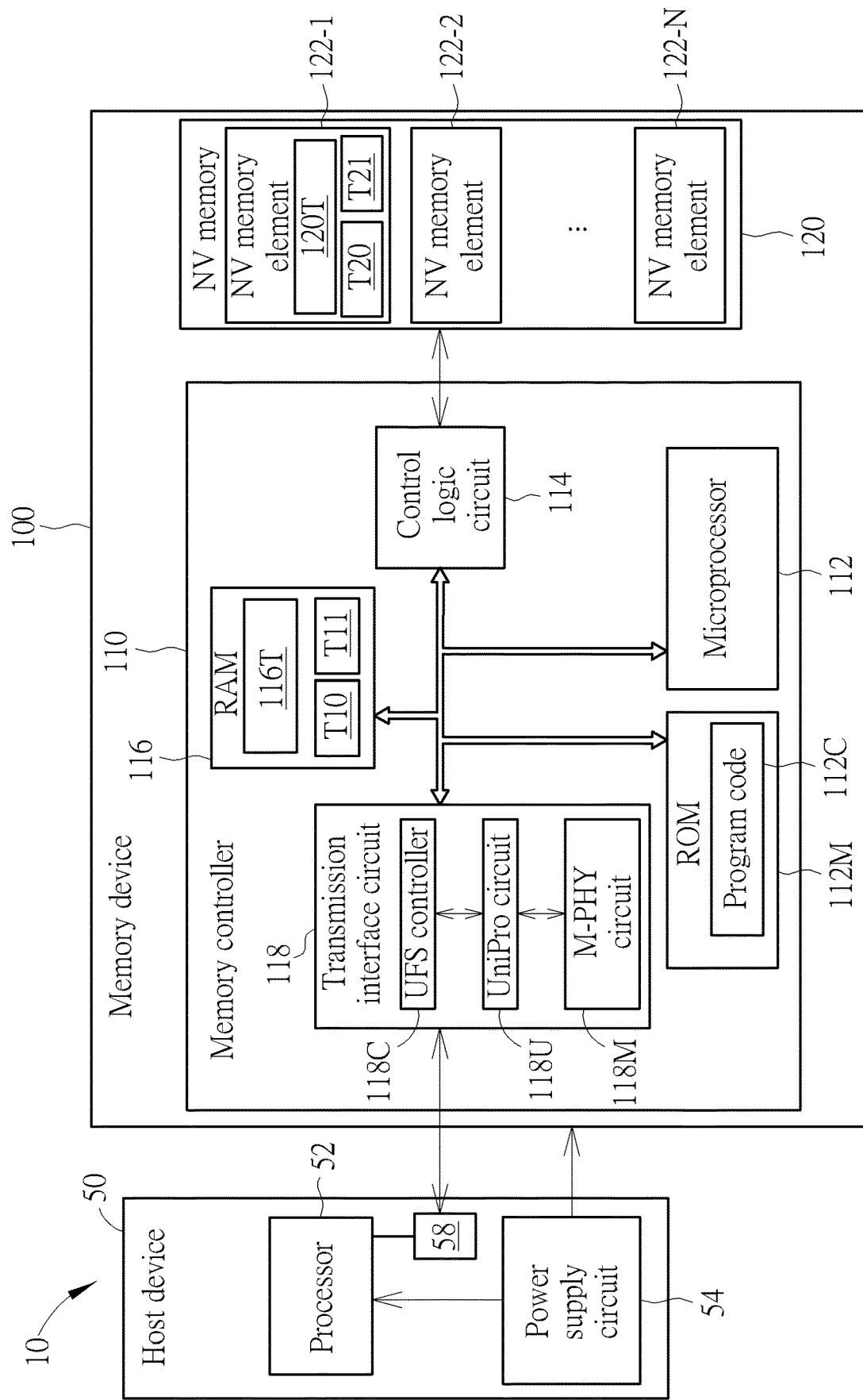
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, ..., and 122-N, where "N" may represent a positive integer that is greater than one. For example, the NV memory 120 may be a flash memory, and the plurality of NV memory elements 122-1, 122-2, ..., and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a Random Access Memory (RAM) 116 (which may be implemented by way of Static Random Access Memory (SRAM), for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update multiple physical-to-logical (P2L) address mapping tables such as the P2L address mapping tables T20 and T21, respectively. For example, the memory controller 110 may refer to the P2L address mapping tables T20 and T21 to perform garbage collection (GC) operations, respectively.

For better comprehension, the global L2P address mapping table 120T may be located in a predetermined region within the NV memory element 122-1, such as a system region, where the multiple P2L address mapping tables such as the P2L address mapping tables T20 and T21 may be located in the predetermined region (e.g., the system region) within the NV memory element 122-1, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N may comprise multiple blocks, and a block within the multiple blocks may comprise and record a specific number of pages, where the memory controller 110 may access a certain page of a certain block within the multiple blocks according to a block address and a page address.

According to some embodiments, the memory controller 110 may open at least one block (e.g., one or more blocks) among the plurality of blocks of the aforementioned at least one NV memory element (e.g., the one or more NV memory elements such as {122-1, 122-2, . . . , 122-N}) in the NV memory 120 to be at least one active block (e.g., one or more active blocks) for data buffering, and utilize the aforementioned at least one active block to receive data from the host device 50, such as host-write data, for being written into the NV memory 120. For better comprehension, the data such as the host-write data (e.g., the data to be written into the NV memory 120) may comprise different types of data, and the aforementioned at least one active block may comprise multiple active blocks. During receiving the data such as the host-write data (e.g., the data to be written into the NV memory 120) from the host device 50, the memory controller 110 may utilize the multiple active blocks to receive the different types of data among the host-write data (e.g., the data to be written into the NV memory 120) according to at least one predetermined rule (e.g., one or more predetermined rules), and generate or update multiple temporary P2L address mapping tables corresponding to the multiple active blocks, such as the temporary P2L address mapping tables T10 and T11, and more particularly, record P2L table entries in the multiple temporary P2L address mapping tables such as the temporary P2L address mapping tables T10 and T11 to indicate P2L address mapping relationships regarding the multiple active blocks, respectively, but the present invention is not limited thereto. For example, the aforementioned at least one predetermined rule may vary, and the associated operations may vary correspondingly. In addition, the memory controller 110 may copy P2L table entries from the multiple temporary P2L address mapping tables (e.g., the temporary P2L address mapping tables T10 and T11) to the multiple P2L address mapping tables (e.g., the P2L address mapping tables T20 and T21), to generate or update the multiple P2L address mapping tables (e.g., the P2L address mapping tables T20 and T21) according to the multiple temporary P2L address mapping tables (e.g., the temporary P2L address mapping tables T10 and T11), respectively.

According to some embodiments, operations of the memory device 100 (e.g., the memory controller 110) may comprise:

(1) the memory device 100 (e.g., the memory controller 110) may receive a first command from the host device 50 through the transmission interface circuit 118 of the memory controller 110, where the first command may carry first information related to first data to be written, for example, the first information may comprise at least one first logical address (e.g., one or more first logical addresses) for indicating at least one first logical address region (e.g., one or more first logical address regions), and the first command may indicate that writing the first data into the aforementioned at least one first logical address region is requested;

(2) the memory device 100 (e.g., the memory controller 110) may perform a first checking operation on the first information to generate a first determination result, where the first determination result may indicate whether the first data belongs to hot data or cold data, and the hot data and the cold data may represent frequently accessed data and infrequently accessed data, respectively;

(3) the memory device 100 (e.g., the memory controller 110) may determine a selected active block among the multiple active blocks mentioned above according to the first determination result and according to the aforementioned at least one predetermined rule (e.g., the one or more predetermined rule), where the multiple active blocks may comprise a hybrid active block and a hot active block for receiving hybrid data and a first portion of the hot data, respectively, and the hybrid data may comprise the cold data and another portion of the hot data; and (4) the memory device 100 (e.g., the memory controller 110) may receive the first data with the selected active block, and update a temporary P2L address mapping table (e.g., one of the temporary P2L address mapping tables T10 and T11) corresponding to the selected active block, for generating or updating a P2L address mapping table (e.g., a corresponding P2L address mapping table among the P2L address mapping tables T20 and T21) in the NV memory 120 for performing subsequent processing, where the temporary P2L address mapping table may be one of the multiple temporary P2L address mapping tables (e.g., the temporary P2L address mapping tables T10 and T11) respectively corresponding to the multiple active blocks, and the multiple temporary P2L address mapping tables (e.g., the temporary P2L address mapping tables T10 and T11) may be arranged to occupy table regions of different sizes in the RAM 116 within the memory controller 110, respectively;

but the present invention is not limited thereto. According to some embodiments, the memory device 100 (e.g., the memory controller 110) may be arranged to store files of various sizes, such as large files (e.g., user files of the user) and small files (e.g., system files of the host device 50), where the memory device 100 (e.g., the memory controller 110) may determine the data of the large files and the data of the small files to belong to the cold data and the hot data, respectively.

Figure 2:
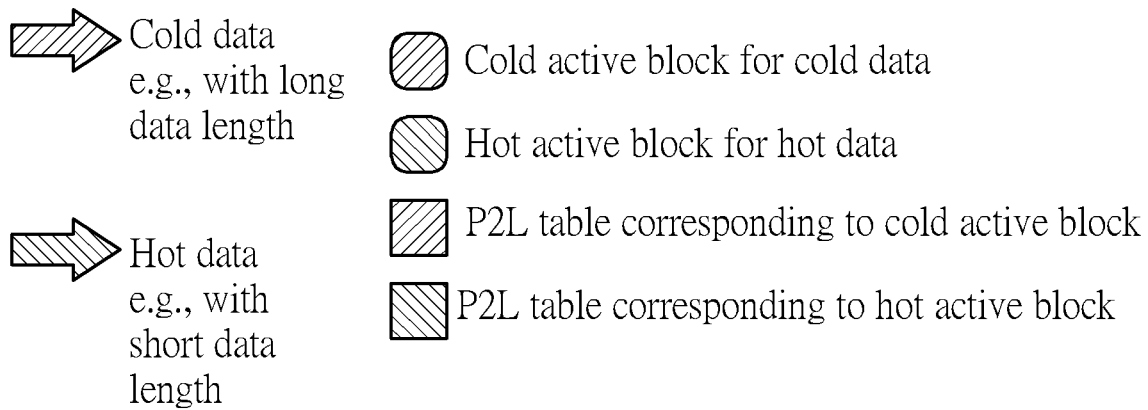
FIG. 2 illustrates a balanced data splitting and reception control scheme.
Figure 2:
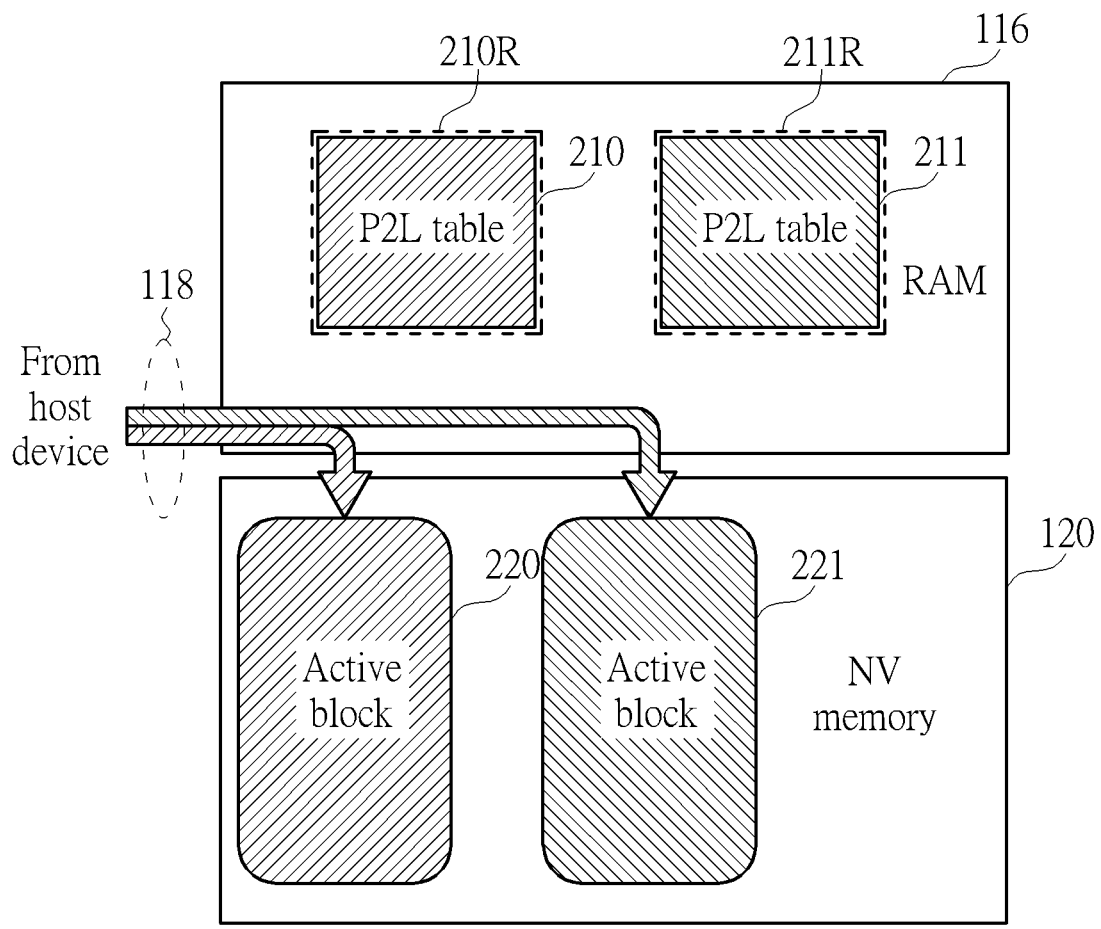

FIG. 2 illustrates a balanced data splitting and reception control scheme. For better comprehension, assume that one or more functions of the memory device 100 (e.g., the memory controller 110), as well as the associated features thereof, can be temporarily disabled, and more particularly, the memory device 100 (e.g., the memory controller 110) can operate according to the balanced data splitting and reception control scheme, where the temporary P2L address mapping tables 210 and 211 (labeled "P2L table" for brevity) can be taken as examples of the temporary P2L address mapping tables T10 and T11, respectively, but the present invention is not limited thereto.

As shown in FIG. 2, the temporary P2L address mapping tables 210 and 211 may be arranged to occupy table regions 210R and 211R of the same size in the RAM 116, respectively, and the multiple active blocks may comprise a cold active block 220 and a hot active block 221 (labeled "Active block" for brevity) for receiving the cold data and the hot data, respectively. In addition, the temporary P2L address mapping table 210 corresponding to the cold active block 220 may be arranged to record one or more P2L table entries for indicating one or more P2L address mapping relationships regarding the cold active block 220, such as the P2L address mapping relationships of the cold data in the cold active block 220, and the temporary P2L address mapping table 211 corresponding to the hot active block 221 may be arranged to record one or more P2L table entries for indicating one or more P2L address mapping relationships regarding the hot active block 221, such as the P2L address mapping relationships of the hot data in the hot active block 221. Additionally, the first information may further comprise a first data length of the first data.

Based on the balanced data splitting and reception control scheme, the memory controller 110 may be arranged to generate the first determination result according to the first data length. For example, if the first data length reaches (e.g., be greater than or equal to) a predetermined data length threshold, the memory controller 110 may determine that the first data belongs to the cold data; otherwise, the memory controller 110 may determine that the first data belongs to the hot data. As a result, the memory controller 110 may receive and store the cold data (e.g., the data with long data lengths) with the cold active block 220, and receive and store the hot data (e.g., the data with short data lengths) with the hot active block 221.

According to some embodiments, whether the first data belongs to the cold data or the hot data may be determined in a different manner, for example, according to a certain host-determined indication sent from the host side such as the host device 50, which may cause a data error problem at the device side such as the memory device 100. In order to guarantee the correctness of all received data at the device side, it may be needed for the memory controller 110 to search for any data having the same logical address as that of the first data in the hot active block 221 when the host-determined indication indicates that the first data belongs to the cold data, or to search for any data having the same logical address as that of the first data in the cold active block 220 when the host-determined indication indicates that the first data belongs to the hot data. As a result, the writing speed may be significantly decreased due to the searching operations. According to some embodiments, the memory controller 110 (e.g., the processing circuit therein, such as the microprocessor 112) may be arranged to perform data access management of the memory device 100 with aid of unbalanced table update, to greatly increase the writing speed and thereby enhance the overall performance.

Figure 3:
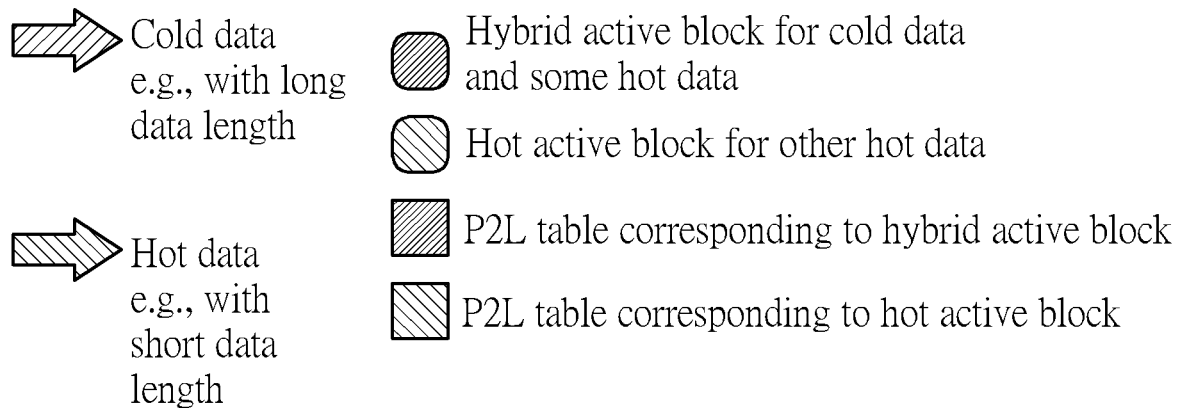
FIG. 3 illustrates an unbalanced data splitting and reception control scheme of a method for performing data access management of a memory device in a predetermined communications architecture with aid of unbalanced table update according to an embodiment of the present invention.
Figure 3:
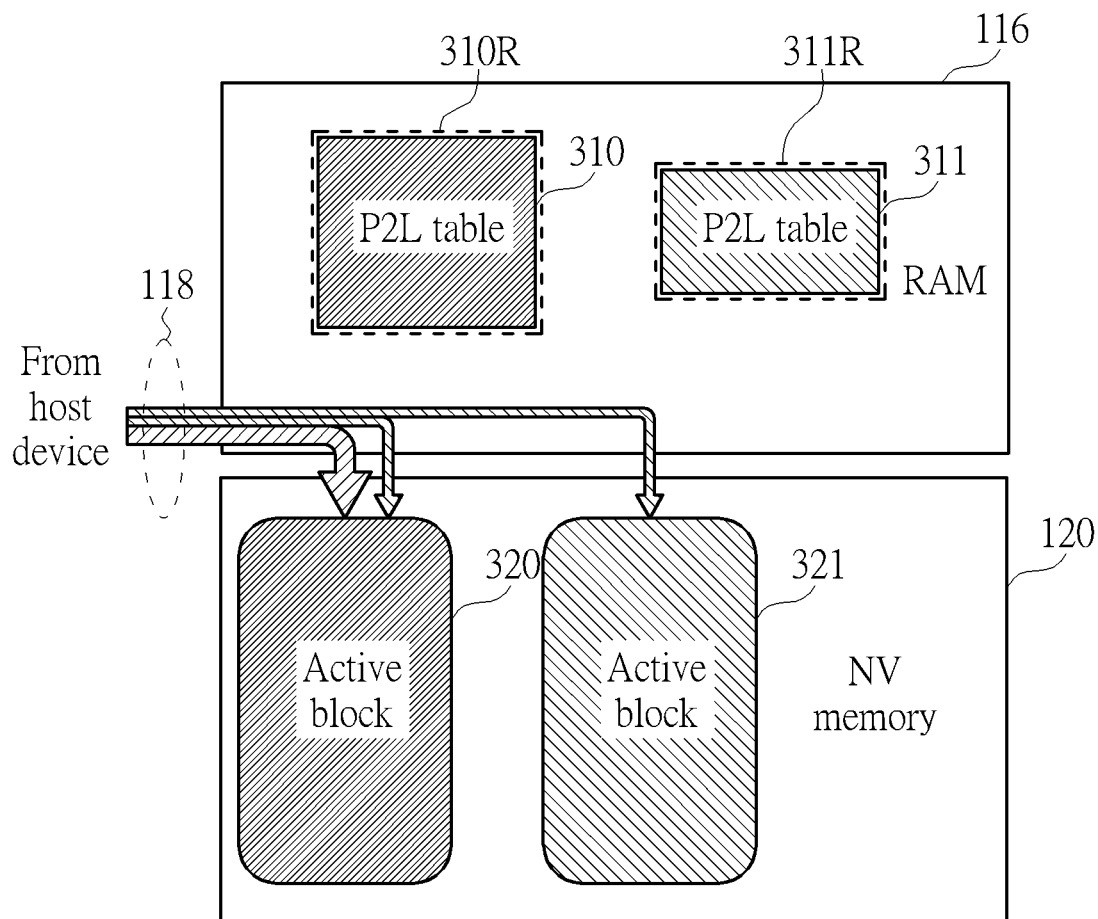

FIG. 3 illustrates an unbalanced data splitting and reception control scheme of a method for performing data access management of a memory device such as that shown in FIG. 1 in a predetermined communications architecture (e.g., a UFS communications architecture) with aid of unbalanced table update according to an embodiment of the present invention. The method can be applied to the architecture shown in FIG. 1, for example, the electronic device 10, the host device 50, the memory device 100, and the memory controller 110, and more particularly, the components within the memory controller 110. For example, the memory device 100 (e.g., the memory controller 110) can operate according to the unbalanced data splitting and reception control scheme shown in FIG. 3, where the temporary P2L address mapping tables 310 and 311 (labeled "P2L table" for brevity) can be taken as examples of the temporary P2L address mapping tables T10 and T11, respectively.

As shown in FIG. 3, the temporary P2L address mapping tables 310 and 311 may be arranged to occupy table regions 310R and 311R of different sizes in the RAM 116, respectively, and the multiple active blocks may comprise a hybrid active block 320 and a hot active block 321 (labeled "Active block" for brevity) for receiving the hybrid data and the first portion of the hot data, respectively, and the hybrid data may comprise the cold data and the other portion (e.g., the aforementioned another portion) of the hot data, where the hybrid active block 320 and the hot active block 321 can be taken as examples of the hybrid active block and the hot active block mentioned above, respectively. In addition, the temporary P2L address mapping table 310 corresponding to the hybrid active block 320 may be arranged to record one or more P2L table entries for indicating one or more P2L address mapping relationships regarding the hybrid active block 320, such as the P2L address mapping relationships of the hybrid data (e.g., the cold data and the other portion of the hot data) in the hybrid active block 320, and the temporary P2L address mapping table 311 corresponding to the hot active block 321 may be arranged to record one or more P2L table entries for indicating one or more P2L address mapping relationships regarding the hot active block 321, such as the P2L address mapping relationships of partial hot data (e.g., the first portion of the hot data) in the hot active block 321. Additionally, the first information may comprise the first data length of the first data.

Based on the unbalanced data splitting and reception control scheme, the memory controller 110 may be arranged to generate the first determination result according to the first data length. For example, if the first data length reaches (e.g., be greater than or equal to) the predetermined data length threshold, the memory controller 110 may determine that the first data belongs to the cold data; otherwise, the memory controller 110 may determine that the first data belongs to the hot data. In addition, during determining the selected active block among the multiple active blocks according to the first determination result and according to the aforementioned at least one predetermined rule, the memory controller 110 may selectively perform at least one other checking operation (e.g., one or more other checking operations) corresponding to the aforementioned at least one predetermined rule on the first information to generate at least one other determination result (e.g., one or more other determination results), for determining the selected active block among the multiple active blocks, where the aforementioned at least one other determination result may indicate whether exceptional processing regarding determining the selected active block among the multiple active blocks is needed. For example, the exceptional processing regarding determining the selected active block among the multiple active blocks may be arranged to make the other portion of the hot data be received with the hybrid active block 320, rather than being received with the hot active block 321, and make the first portion of the hot data be received with the hot active block 321, rather than being received with the hybrid active block 320. As a result, the memory controller 110 may receive and store the hybrid data, such as the cold data (e.g., the data with long data lengths) and the other portion (labeled "some hot data" for better comprehension) among the hot data (e.g., the data with short data lengths), with the hybrid active block 320, and receive and store the partial hot data, such as the first portion (labeled "other hot data" for better comprehension) among the hot data (e.g., the data with short data lengths), with the hot active block 321. For brevity, similar descriptions for this embodiment are not repeated in detail here.

Some implementation details related to the exceptional processing may be described as follows. According to some embodiments, the memory controller 110 may receive and store any data belonging to the cold data (e.g., the data with long data lengths) with the hybrid active block 320 and receive and store any data belonging to the hot data (e.g., the data with short data lengths) with the hot active block 321 by default, except for one or more exceptional cases such as some special cases. More particularly, in a situation where any special case among these special cases is detected, the memory controller 110 may receive and store the hot data with the hybrid active block 320, rather than the hot active block 321, where the memory controller 110 may determine the selected active block among the multiple active blocks according to the first determination result and the aforementioned at least one other determination result. For brevity, similar descriptions for these embodiments are not repeated in detail here.

Figure 4:
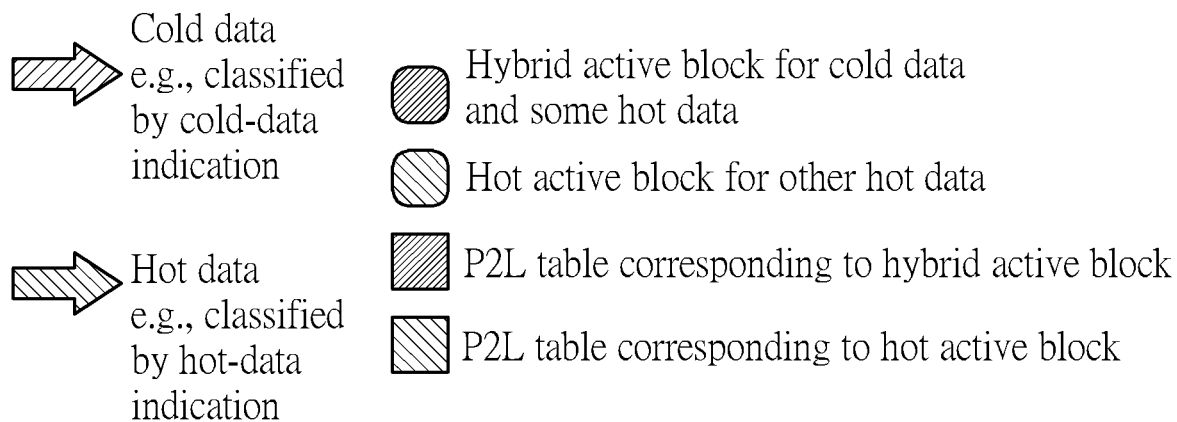
FIG. 4 illustrates an unbalanced data splitting and reception control scheme of the according to another embodiment of the present invention.
Figure 4:
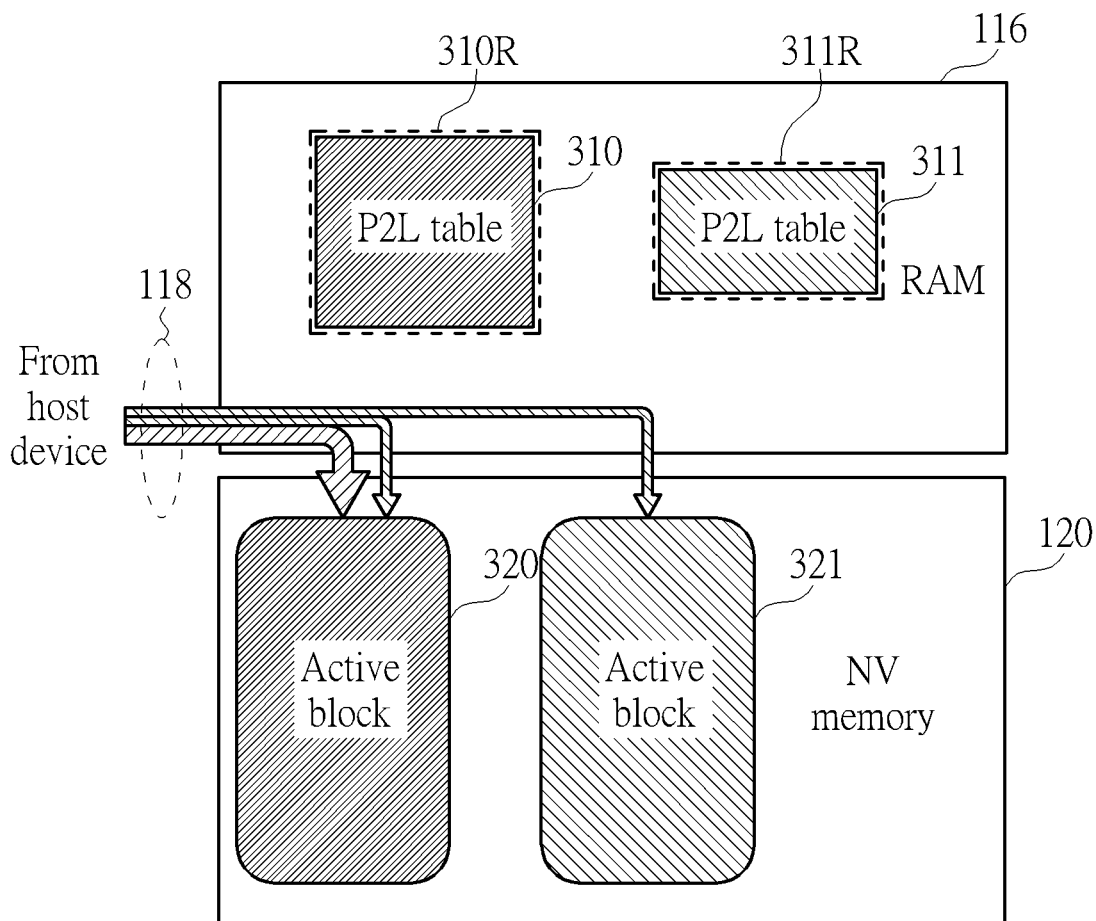

FIG. 4 illustrates an unbalanced data splitting and reception control scheme of the according to another embodiment of the present invention. For example, the memory device 100 (e.g., the memory controller 110) can operate according to the unbalanced data splitting and reception control scheme shown in FIG. 4, where the temporary P2L address mapping tables 310 and 311 (labeled "P2L table" for brevity) can be taken as examples of the temporary P2L address mapping tables T10 and T11, respectively. In comparison with the embodiment shown in FIG. 3, the memory controller 110 may generate the first determination result according to the aforementioned host-determined indication such as a first indication, rather than the first data length. For example, in addition to the aforementioned at least one first logical address, the first information may further comprise the first indication for indicating whether the first data belongs to the hot data or the cold data, where the first information may still comprise the first data length of the first data when there is a need, but the present invention is not limited thereto.

Based on the unbalanced data splitting and reception control scheme shown in FIG. 4, the memory controller 110 may be arranged to generate the first determination result according to the first indication. For example, if the first indication is equal to a cold-data indication (e.g., the cold-data indication may indicate that the first data belongs to the cold data, as classified by the host device 50), the memory controller 110 may determine that the first data belongs to the cold data; otherwise, in a situation where the first indication is equal to a hot-data indication (e.g., the hot-data indication may indicate that the first data belongs to the hot data, as classified by the host device 50), the memory controller 110 may determine that the first data belongs to the hot data. For brevity, similar descriptions for this embodiment are not repeated in detail here.

Figure 5:
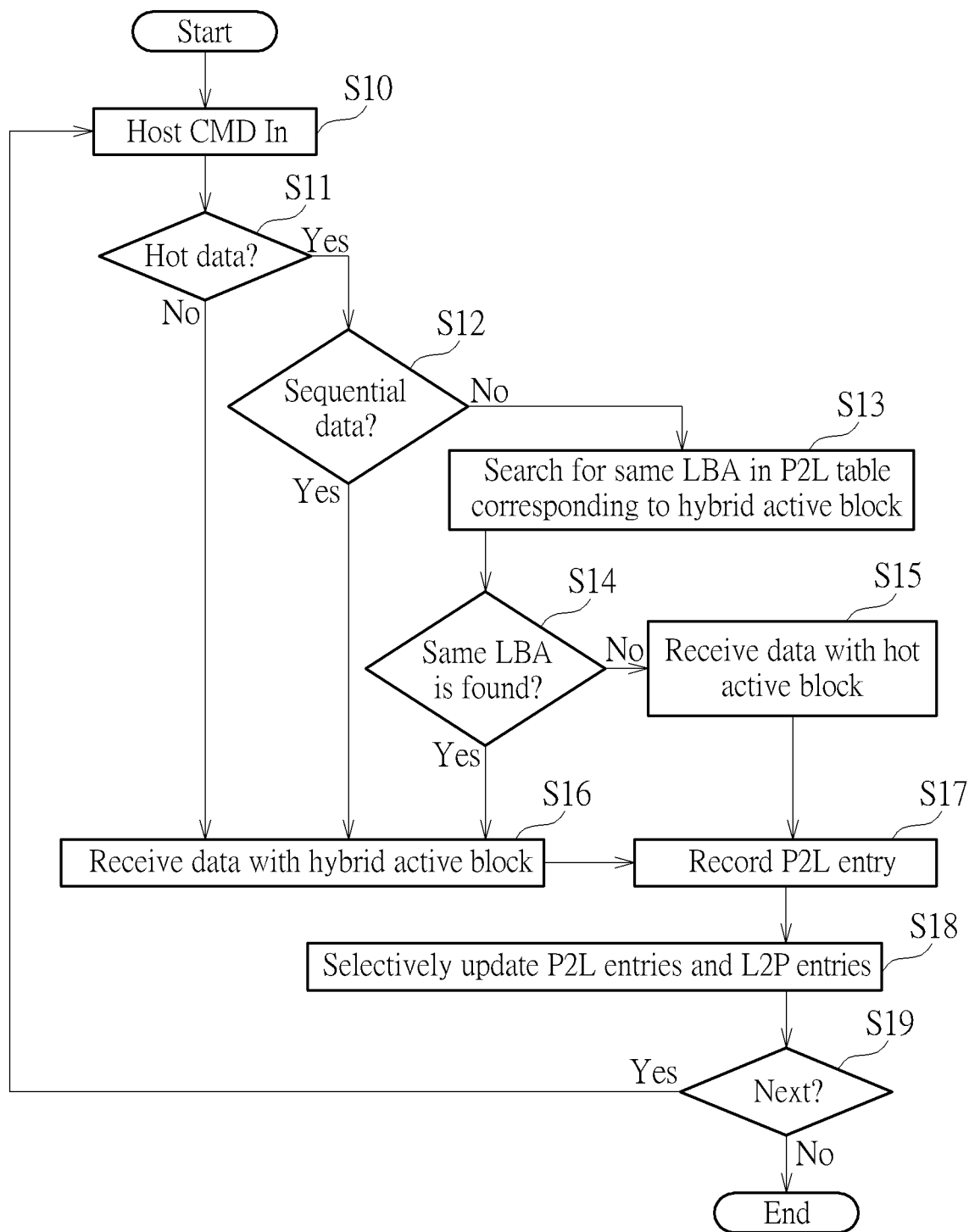
FIG. 5 illustrates a working flow of the method according to an embodiment of the present invention.

FIG. 5 illustrates a working flow of the method according to an embodiment of the present invention. For example, the working flow shown in FIG. 5 may correspond to one or more embodiments described above, but the present invention is not limited thereto.

In Step S10, the memory device 100 (e.g., the memory controller 110) may receive the first command such as a command CMD from the host device 50 through the transmission interface circuit 118 of the memory controller 110 (labeled "Host CMD In" for brevity), where the first command may carry the first information related to the first data to be written. For example, the first information may comprise the aforementioned at least one first logical address (e.g., at least one logical block address (LBA) such as one or more LBAs) for indicating the aforementioned at least one first logical address region (e.g., at least one LBA region such as one or more LBA regions), and the first command may indicate that writing the first data into the aforementioned at least one first logical address region (e.g., the aforementioned at least one LBA region) is requested.

In Step S11, the memory device 100 (e.g., the memory controller 110) may perform the first checking operation on the first information (e.g., the information carried by the command CMD) to generate the first determination result, for determining whether the first data belongs to the hot data (labeled "Hot data?" for brevity), where the first determination result may indicate whether the first data belongs to the hot data or the cold data, and the hot data and the cold data may represent the frequently accessed data and the infrequently accessed data, respectively. If Yes (e.g., the first data belongs to the hot data), Step S12 is entered; if No (e.g., the first data belongs to the cold data), Step S16 is entered.

The determination results "Yes" and "No" of Step S11 can be taken as examples of the first determination result. In addition, the aforementioned at least one predetermined rule may comprise a first predetermined rule and a second predetermined rule, for example:

(1) the first predetermined rule: when the first data is sequential data, the memory device 100 (e.g., the memory controller 110) is arranged to receive and store the first data with the hybrid active block 320, where the memory controller 110 may determine whether the first data is sequential data according to the first information (e.g., the aforementioned at least one first logical address and/or the first data length); and (2) the second predetermined rule: when any logical address (e.g., any LBA) among the aforementioned at least one first logical address (e.g., the aforementioned at least one LBA) is found in the temporary P2L address mapping table 310 corresponding to the hybrid active block 320, which may indicate that a previous version of the data at the aforementioned any logical address (e.g., the aforementioned any LBA) exists in the hybrid active block 320, the memory device 100 (e.g., the memory controller 110) is arranged to receive and store the first data with the hybrid active block 320, where the first data being received and stored with the hybrid active block 320 may become the latest version of the data at the aforementioned any logical address (e.g., the aforementioned any LBA), and the previous version of the data at the aforementioned any logical address (e.g., the aforementioned any LBA) may become invalid data;

where the determination results "Yes" and "No" of any step among Steps S12 and S14 can be taken as examples of the aforementioned at least one other determination result, but the present invention is not limited thereto. Regarding the second predetermined rule, receiving and storing the first data with the hybrid active block 320 can guarantee the correctness of the data, and more particularly, prevent the previous version and the latest version of the data from being unnecessarily scattered and thereby prevent the associated GC loading, to enhance the overall performance.

As illustrated with some partial working flows within the working flow shown in FIG. 5, determining the selected active block among the multiple active blocks (e.g., the hybrid active block 320 and the hot active block 321) according to the first determination result (e.g., one of the determination results "Yes" and "No" of Step S11) and according to the aforementioned at least one predetermined rule may comprise selectively performing the aforementioned at least one other checking operation (e.g., the operations of Steps S12 and S14) corresponding to the aforementioned at least one predetermined rule (e.g., the first predetermined rule and the second predetermined rule) on the first information (e.g., the aforementioned at least one first logical address and/or the first data length) to generate the aforementioned at least one other determination result, for determining the selected active block among the multiple active blocks. For example, the aforementioned at least one other checking operation may comprise a second checking operation (e.g., the operation of Step S12), and the aforementioned at least one other determination result may comprise a second determination result obtained from performing the second checking operation, where the second determination result may indicate whether the first data is sequential data.

In Step S12, the memory device 100 (e.g., the memory controller 110) may determine whether the first data is sequential data, for example, according to whether the aforementioned at least one first logical address (e.g., the aforementioned at least one LBA) comprises more than one logical address (e.g., more than one LBA) and/or whether the first data length is greater than one to indicate more than one logical address (e.g., more than one LBA), wherein when the aforementioned at least one first logical address (e.g., the aforementioned at least one LBA) comprises more than one logical address (e.g., more than one LBA) or when the first data length is greater than one to indicate more than one logical address (e.g., more than one LBA), the memory controller 110 may determine that the first data is sequential data, but the present invention is not limited thereto. According to some embodiments, the memory device 100 (e.g., the memory controller 110) may determine whether the first data is sequential data according to whether the aforementioned at least one first logical address (e.g., the aforementioned at least one LBA) is the next logical address (e.g. the next LBA) of a previous logical address (e.g., a previous LBA) of previous data that has just been written, wherein when the aforementioned at least one first logical address (e.g., the aforementioned at least one LBA) is the next logical address (e.g. the next LBA) of the previous logical address (e.g., the previous LBA) of the previous data that has just been written, the memory controller 110 may determine that the first data is sequential data. If Yes (e.g., the first data is sequential data), Step S16 is entered; if No (e.g., the first data is not sequential data), Step S13 is entered.

Regarding the operations of Steps S13 and S14, the architecture shown in any of FIG. 3 and FIG. 4 can be taken as an example. The multiple temporary P2L address mapping tables may comprise the temporary P2L address mapping table 310 corresponding to the hybrid active block 320 and the temporary P2L address mapping table 311 corresponding to the hot active block 321. For example, the aforementioned at least one other checking operation may further comprise a third checking operation (e.g., the operation of Step S14), and the aforementioned at least one other determination result may further comprise a third determination result obtained from performing the third checking operation, where the third determination result may indicate whether a same logical address (e.g., a same LBA) among the aforementioned at least one first logical address (e.g., the aforementioned at least one LBA), such as the aforementioned any logical address (e.g., the aforementioned any LBA), is found in the temporary P2L address mapping table 310 corresponding to the hybrid active block 320.

In Step S13, the memory device 100 (e.g., the memory controller 110) may search for the same logical address such as the same LBA in the temporary P2L address mapping table 310 corresponding to the hybrid active block 320.

In Step S14, the memory device 100 (e.g., the memory controller 110) may determine whether the same logical address such as the same LBA is found in the temporary P2L address mapping table 310 corresponding to the hybrid active block 320. If Yes (e.g., the same LBA is found in the temporary P2L address mapping table 310), Step S16 is entered; if No (e.g., the same LBA is not found in the temporary P2L address mapping table 310), Step S15 is entered.

In Step S15, the memory device 100 (e.g., the memory controller 110) may determine the selected active block to be the hot active block 321, and more particularly, receive the first data with the hot active block 321, where the first data may be written into the hot active block 321.

In Step S16, the memory device 100 (e.g., the memory controller 110) may determine the selected active block to be the hybrid active block 320, and more particularly, receive the first data with the hybrid active block 320, where the first data may be written into the hybrid active block 320.

In Step S17, the memory device 100 (e.g., the memory controller 110) may record at least one P2L table entry (e.g., one or more P2L table entries) corresponding to the first data into the temporary P2L address mapping table corresponding to the selected active block (e.g., the hybrid active block 320 or the hot active block 321), such as the temporary P2L address mapping table 310 corresponding to the hybrid active block 320 or the temporary P2L address mapping table 311 corresponding to the hot active block 321 (labeled "Record P2L entry" for brevity), for indicating at least one P2L address mapping relationship (e.g., one or more P2L address mapping relationships) of the first data.

In Step S18, the memory device 100 (e.g., the memory controller 110) may selectively update P2L table entries (labeled "P2L entries" for brevity) in the P2L address mapping tables T20 and T21 and L2P table entries (labeled "L2P entries" for brevity) in the global L2P address mapping table 120T for at least one target active block (e.g., one or more target active blocks) among the multiple active blocks (e.g., the hybrid active block 320 and the hot active block 321), respectively. For example, the memory controller 110 may selectively update the P2L table entries such as all P2L table entries of at least one temporary P2L address mapping table corresponding to the aforementioned at least one target active block and the corresponding L2P table entries such as the L2P table entries corresponding to these P2L table entries into the associated table blocks (e.g., the table blocks for storing the P2L address mapping tables T20 and T21 and the global L2P address mapping table 120T, respectively) in the NV memory 120 (e.g., the system region thereof).

In Step S19, the memory device 100 (e.g., the memory controller 110) may determine whether to perform a next operation, for example, according to whether there is sufficient storage space within a data region of the NV memory 120. If Yes (e.g., there is sufficient storage space within the data region of the NV memory 120), Step S10 is entered; if No (e.g., there is no sufficient storage space within the data region of the NV memory 120), the working flow shown in FIG. 5 comes to the end.

The multiple temporary P2L address mapping tables such as the temporary P2L address mapping tables 310 and 311 can be arranged to occupy the table regions 310R and 311R of different sizes in the RAM 116 within the memory controller 110, respectively, for enhancing the overall performance, where the table region 311R of the temporary P2L address mapping table 311 corresponding to the hot active block 321 is smaller than the table region 310R of the temporary P2L address mapping table 310 corresponding to the hybrid active block 320. For example, when the first data belongs to the cold data, the memory device 100 (e.g., the memory controller 110) can receive and store the first data with the hybrid active block 320 directly without searching, in order to maximize the write speed and the write amount. When the first data belongs to the hot data, the memory device 100 (e.g., the memory controller 110) can perform the operations of Steps S13 and S14 to achieve the correctness of the data, wherein as the content (e.g., the data amount) of the hot data should be less than the content (e.g., the data amount) of the cold data, and the content (e.g., the data amount) of the first portion of the hot data should be much less than the content (e.g., the data amount) of the hybrid data (e.g., the cold data and the other portion of the hot data), the number of searching operations can be greatly reduced. In addition, when the first data belongs to the hot data and is continuous data with a large data amount, the memory device 100 (e.g., the memory controller 110) can receive and store the first data with the hybrid active block 320 directly without searching, in order to maximize the write speed and the write amount, wherein as there is only hot data, the hot data at this time will not cause any data fragmentation.

For better comprehension, the method may be illustrated with the working flow shown in FIG. 5, but the present invention is not limited thereto. According to some embodiments, one or more steps may be added, deleted, or changed in the working flow shown in FIG. 5. For example, after any active block among the multiple active blocks (e.g., the hybrid active block 320 and the hot active block 321) is fully programmed, the memory device 100 (e.g., the memory controller 110) may close the aforementioned any active block to make the aforementioned any active block become an inactive block, and select a blank block (e.g., an erased block) to be a replacement of the aforementioned any active block among the multiple active blocks, for performing subsequent data reception corresponding to the aforementioned any active block. In addition, the subsequent processing mentioned above may comprise performing a GC procedure to write valid data among all data in the inactive block into another blank block (e.g., another erased block). For brevity, similar descriptions for these embodiments are not repeated in detail here.

According to some embodiments, Step S13 may be entered in a situation where the first data belongs to the hot data and is determined as a small data chunk (rather than the sequential data), and the number of times of executing Step S13 may be very small. As a result, the memory device 100 (e.g., the memory controller 110) may operate with extremely high performance most of the time, and executing Step S13 a few times will not significantly decrease the overall performance. As Step S15 may be entered in a situation where Steps S13 and S14 are entered first, the data of the hot active block 321 (e.g., all data received and stored with the hot active block 321) should have undergone the checking operation of Step S14, and more particularly, the memory device 100 (e.g., the memory controller 110) should have searched for the logical addresses (e.g., the LBAs) of the data of the hot active block 321 in the temporary P2L address mapping table 310 corresponding to the hybrid active block 320, without finding any logical address (e.g., any LBA) among the logical addresses (e.g., the LBAs) of the data of the hot active block 321 in the temporary P2L address mapping table 310 corresponding to the hybrid active block 320, in order to guarantee the correctness of all received data at the device side. For brevity, similar descriptions for these embodiments are not repeated in detail here.

Figure 6A:
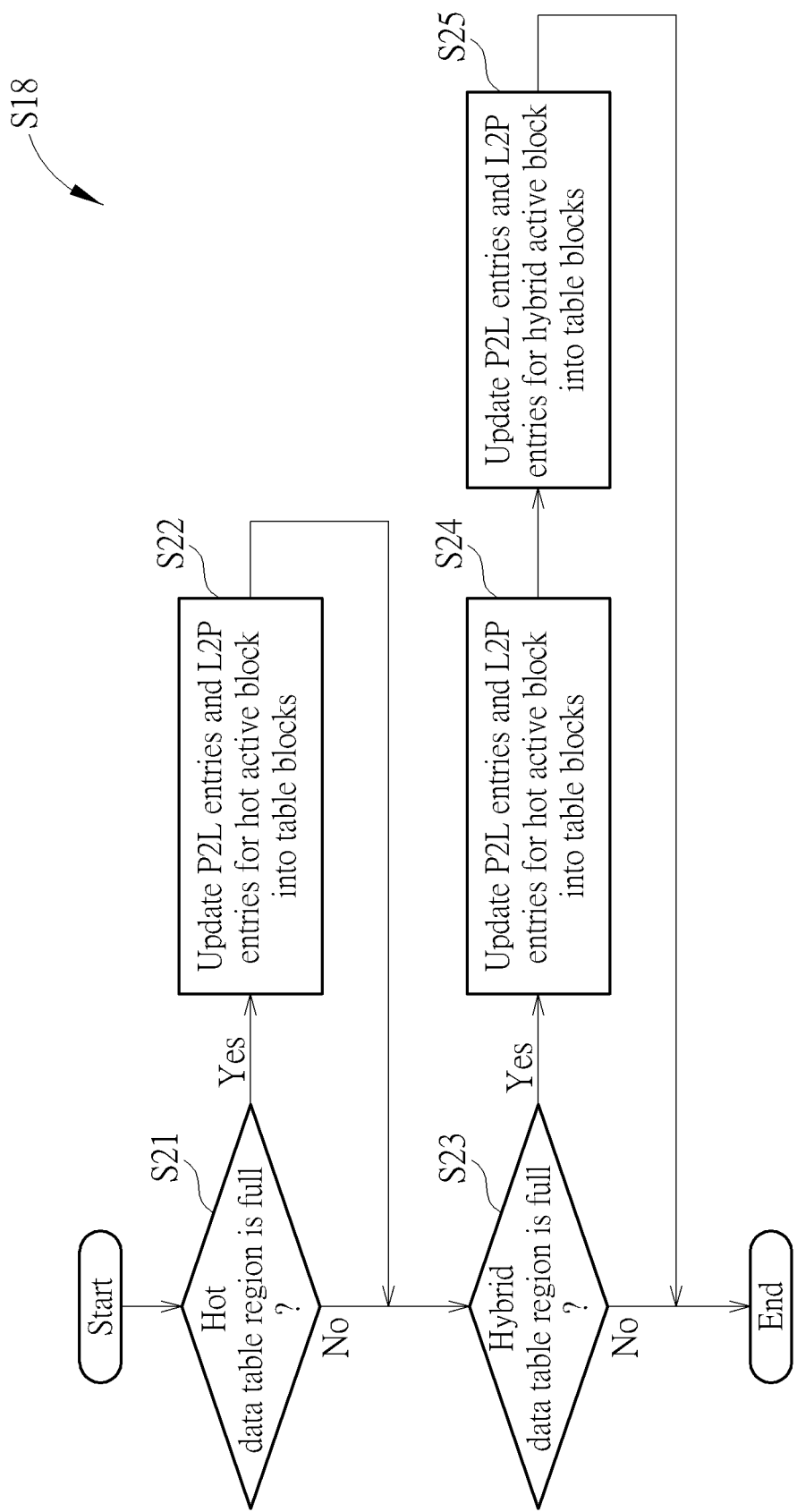
FIG. 6A illustrates some implementation details of the working flow shown in FIG. 5 according to an embodiment of the present invention.

FIG. 6A illustrates some implementation details of the working flow shown in FIG. 5 according to an embodiment of the present invention. For example, Step S18 of the working flow shown in FIG. 5 may comprise multiple sub-steps such as Steps S21-S25 of the working flow shown in FIG. 6A, where one or more operations in a first loop comprising Steps S21 and S22 may be performed first, and one or more operations in a second loop comprising Steps S23-S25 may be performed afterward, but the present invention is not limited thereto. According to some embodiments, Steps S21 and S23 may be integrated into a same step, where the associated partial working flows may vary correspondingly.

In Step S21, the memory device 100 (e.g., the memory controller 110) may determine whether the table region 311R of the temporary P2L address mapping table 311 corresponding to the hot active block 321 is full (labeled "Hot data table region is full" for brevity). If Yes (e.g., the table region 311R of the temporary P2L address mapping table 311 is full), Step S22 is entered; if No (e.g., the table region 311R of the temporary P2L address mapping table 311 is not full), Step S23 is entered.

In Step S22, the memory device 100 (e.g., the memory controller 110) may update P2L table entries (labeled "P2L entries" for brevity) such as all P2L table entries of the temporary P2L address mapping table 311 and corresponding L2P table entries (labeled "L2P entries" for brevity) such as the L2P table entries corresponding to these P2L table entries for the hot active block 321 into the associated table blocks (e.g., the table blocks for storing the P2L address mapping table T21 and the global L2P address mapping table 120T, respectively) in the NV memory 120 (e.g., the system region thereof), and more particularly, update the P2L address mapping table T21 and the global L2P address mapping table 120T according to the P2L table entries currently stored in the temporary P2L address mapping table 311.

For example, the memory controller 110 may copy the P2L table entries currently stored in the temporary P2L address mapping table 311 into the P2L address mapping table T21. When detecting that any old P2L table entry in the P2L address mapping table T21 corresponds to (e.g., has) a same logical address as that of any new P2L table entry obtained from the temporary P2L address mapping table 311, the memory controller 110 may mark the aforementioned any old P2L table entry in the P2L address mapping table T21 to be an invalid P2L table entry. In addition, the address mapping relationships of the P2L table entries in the temporary P2L address mapping table 311 and the address mapping relationships of the corresponding L2P table entries in the global L2P address mapping table 120T should be consistent with each other and free from contradiction, where the P2L address mapping relationships indicated by the P2L table entries in the temporary P2L address mapping table 311 and the L2P address mapping relationships indicated by the corresponding L2P table entries in the global L2P address mapping table 120T should be reverse address mapping relationships of each other, respectively. Based on the reverse address mapping relationships, the memory controller 110 may generate the corresponding L2P table entries according to the P2L table entries in the temporary P2L address mapping table 311, respectively, and write the corresponding L2P table entries into the global L2P address mapping table 120T. When detecting that any old L2P table entry in the global L2P address mapping table 120T corresponds to (e.g., has) a same logical address as that of any new L2P table entry (e.g., the new L2P table entry generated according to a certain P2L table entry in the temporary P2L address mapping table 311), the memory controller 110 may mark this old L2P table entry to be an invalid L2P table entry.

In Step S23, the memory device 100 (e.g., the memory controller 110) may determine whether the table region 310R of the temporary P2L address mapping table 310 corresponding to the hybrid active block 320 is full (labeled "Hybrid data table region is full" for brevity). If Yes (e.g., the table region 310R of the temporary P2L address mapping table 310 is full), Step S24 is entered; if No (e.g., the table region 310R of the temporary P2L address mapping table 310 is not full), the working flow shown in FIG. 6A comes to the end.

In Step S24, the memory device 100 (e.g., the memory controller 110) may update P2L table entries (labeled "P2L entries" for brevity) such as all P2L table entries of the temporary P2L address mapping table 311 and corresponding L2P table entries (labeled "L2P entries" for brevity) such as the L2P table entries corresponding to these P2L table entries for the hot active block 321 into the associated table blocks (e.g., the table blocks for storing the P2L address mapping table T21 and the global L2P address mapping table 120T, respectively) in the NV memory 120 (e.g., the system region thereof), and more particularly, update the P2L address mapping table T21 and the global L2P address mapping table 120T according to the P2L table entries currently stored in the temporary P2L address mapping table 311. For example, the operation of Step S24 may be similar to or the same as the operation of Step S22.

In Step S25, the memory device 100 (e.g., the memory controller 110) may update P2L table entries (labeled "P2L entries" for brevity) such as all P2L table entries of the temporary P2L address mapping table 310 and corresponding L2P table entries (labeled "L2P entries" for brevity) such as the L2P table entries corresponding to these P2L table entries for the hybrid active block 320 into the associated table blocks (e.g., the table blocks for storing the P2L address mapping table T20 and the global L2P address mapping table 120T, respectively) in the NV memory 120 (e.g., the system region thereof), and more particularly, update the P2L address mapping table T20 and the global L2P address mapping table 120T according to the P2L table entries currently stored in the temporary P2L address mapping table 310.

For example, the memory controller 110 may copy the P2L table entries currently stored in the temporary P2L address mapping table 310 into the P2L address mapping table T20. When detecting that any old P2L table entry in the P2L address mapping table T20 corresponds to (e.g., has) a same logical address as that of any new P2L table entry obtained from the temporary P2L address mapping table 310, the memory controller 110 may mark the aforementioned any old P2L table entry in the P2L address mapping table T20 to be an invalid P2L table entry. In addition, the address mapping relationships of the P2L table entries in the temporary P2L address mapping table 310 and the address mapping relationships of the corresponding L2P table entries in the global L2P address mapping table 120T should be consistent with each other and free from contradiction, where the P2L address mapping relationships indicated by the P2L table entries in the temporary P2L address mapping table 310 and the L2P address mapping relationships indicated by the corresponding L2P table entries in the global L2P address mapping table 120T should be reverse address mapping relationships of each other, respectively. Based on the reverse address mapping relationships, the memory controller 110 may generate the corresponding L2P table entries according to the P2L table entries in the temporary P2L address mapping table 310, respectively, and write the corresponding L2P table entries into the global L2P address mapping table 120T. When detecting that any old L2P table entry in the global L2P address mapping table 120T corresponds to (e.g., has) a same logical address as that of any new L2P table entry (e.g., the new L2P table entry generated according to a certain P2L table entry in the temporary P2L address mapping table 310), the memory controller 110 may mark this old L2P table entry to be an invalid L2P table entry.

For better comprehension, the method may be illustrated with the working flow shown in FIG. 6A, but the present invention is not limited thereto. According to some embodiments, one or more steps may be added, deleted, or changed in the working flow shown in FIG. 6A. For example, the order of executing the first loop comprising Steps S21 and S22 and executing the second loop comprising Steps S23-S25 may be exchanged, and therefore, one or more operations in the second loop comprising Steps S23-S25 may be performed first, and one or more operations in the first loop comprising Steps S21 and S22 may be performed afterward. For another example, the memory controller 110 may selectively execute the first loop comprising Steps S21 and S22 or the second loop comprising Steps S23-S25, depending on whether the selected active block is the hot active block 321 or the hybrid active block 320, and therefore, one or more operations in the first loop comprising Steps S21 and S22 may be performed when the selected active block is the hot active block 321, and one or more operations in the second loop comprising Steps S23-S25 may be performed when the selected active block is the hybrid active block 320. For brevity, similar descriptions for these embodiments are not repeated in detail here.

Some implementation details regarding the working flow shown in FIG. 6A may be further described as follows. According to some embodiments, when there is a need, the memory device 100 (e.g., the memory controller 110) may update the P2L address mapping tables T20 and T21 and the global L2P address mapping table 120T according to the temporary P2L address mapping tables 310 and 311, respectively. For example, the memory device 100 (e.g., the memory controller 110) may perform the operation of Step S22 or Step S24 to update the P2L address mapping table T21 and the global L2P address mapping table 120T according to the temporary P2L address mapping table 311. For another example, the memory device 100 (e.g., the memory controller 110) may perform the operation of Step S25 to update the P2L address mapping table T20 and the global L2P address mapping table 120T according to the temporary P2L address mapping table 310. Please note that the memory device 100 (e.g., the memory controller 110) should have searched for the logical addresses (e.g., the LBAs) of the data of the hot active block 321 (e.g., all data received and stored with the hot active block 321) in the temporary P2L address mapping table 310 corresponding to the hybrid active block 320. As illustrated with the partial working flow starting from Step S14, passing through Step S16 and reaching Step S17, if there is any old P2L table entry carrying the same logical address (e.g., the same LBA) in the temporary P2L address mapping table 310, the memory device 100 (e.g., the memory controller 110) can receive the first data with the hybrid active block 320, and write the new P2L table entry carrying the same logical address (e.g., the same LBA) into the temporary P2L address mapping table 310 to be a replacement of the aforementioned any old P2L table entry carrying the same logical address (e.g., the same LBA) in the temporary P2L address mapping table 310, to indicate the latest P2L address mapping relationship of the data at the same logical address (e.g., the same LBA), where all data in the hybrid active block 320 should be the latest data. Therefore, in the first loop comprising Steps S21 and S22, before executing Step S22, the memory device 100 (e.g., the memory controller 110) does not need to perform any operation similar to or the same as the operation of Step S25.

In addition, the memory device 100 (e.g., the memory controller 110) can prevent performing balanced P2L table search (e.g., searching logical addresses such as LBAs in both of the temporary P2L address mapping tables 310 and 311), and more particularly, prevent searching for the logical addresses (e.g., the LBAs) of the data of the hybrid active block 320 (e.g., all data received and stored with the hybrid active block 320) in the temporary P2L address mapping table 311 corresponding to the hot active block 321 to save time and thereby enhance the overall performance. For better comprehension, assume that the memory device 100 (e.g., the memory controller 110) were trying to search for the logical addresses (e.g., the LBAs) of the data of the hybrid active block 320 in the temporary P2L address mapping table 311 corresponding to the hot active block 321. As the data amount of the data of the hybrid active block 320 may increase to become very large, the logical address count of the logical addresses (e.g., the LBA count of the LBAs) thereof in the temporary P2L address mapping table 310 corresponding to the hybrid active block 320 may increase correspondingly, and the number of times of performing the associated searching operations regarding these logical addresses may also increase correspondingly, which means the overall performance would be decreased if the memory device 100 (e.g., the memory controller 110) were trying to do so. In order to guarantee the correctness of the data, the memory device 100 (e.g., the memory controller 110) can perform unbalanced table update such as unbalanced P2L table update and unbalanced L2P table update (e.g., updating the P2L address mapping table T21 and the global L2P address mapping table 120T according to the temporary P2L address mapping table 311 first and selectively updating the P2L address mapping table T20 and the global L2P address mapping table 120T according to the temporary P2L address mapping table 310 afterward, depending on different conditions), rather than performing the balanced P2L table search mentioned above, and more particularly, in the second loop comprising Steps S23-S25, perform the operation of Step S24 to update the P2L address mapping table T21 and the global L2P address mapping table 120T according to the temporary P2L address mapping table 311 first, and perform the operation of Step S25 to update the P2L address mapping table T20 and the global L2P address mapping table 120T according to the temporary P2L address mapping table 310 afterward. As a result, if there is any old P2L table entry carrying the same logical address (e.g., the same LBA) in the temporary P2L address mapping table 311, the memory device 100 (e.g., the memory controller 110) can use the new P2L table entry carrying the same logical address (e.g., the same LBA) in the temporary P2L address mapping table 310 to be a replacement of the aforementioned any old P2L table entry carrying the same logical address (e.g., the same LBA) in the temporary P2L address mapping table 311, to indicate the latest P2L address mapping relationship of the data at the same logical address (e.g., the same LBA). Therefore, the memory device 100 (e.g., the memory controller 110) can perform the unbalanced table update such as the unbalanced P2L table update and the unbalanced L2P table update (rather than performing the balanced P2L table search mentioned above), to enhance the overall performance while maintaining the correctness of all received data at the device side. For brevity, similar descriptions for these embodiments are not repeated in detail here.

According to some embodiments, the temporary P2L address mapping table 310 (e.g., the table region 310R thereof) may be very large and may have a large size such as the size of 16 kilobytes (KB) or 32 KB, and any P2L table entry among the P2L table entries in the temporary P2L address mapping table 310 corresponding to the hybrid active block 320 may have a size of 4 bytes (B), for indicating the P2L address mapping relationship of 4-KB data in the hybrid active block 320. In addition, the temporary P2L address mapping table 311 (e.g., the table region 311R thereof) may be very small and may have a small size such as the size of 1 KB or 2 KB, and any P2L table entry among the P2L table entries in the temporary P2L address mapping table 311 corresponding to the hot active block 321 may have a size of 4 B, for indicating the P2L address mapping relationship of 4-KB data in the hot active block 321. For example, in the first loop comprising Steps S21 and S22, the operation of Step S22 may need to process the P2L table entries corresponding to the size of 1 KB or 2 KB only. In a first case, the memory device 100 (e.g., the memory controller 110) may start receiving the first data (e.g., any data belonging to the hot data and classified as non-sequential data as determined in Step S12 and further classified as having no previous version thereof at the same LBA in the hybrid active block 320 as determined in Step S14) with the hot active block 321 in Step S15 and record the aforementioned at least one P2L table entry into the temporary P2L address mapping table 311 corresponding to the hot active block 321 in Step S17 to cause the temporary P2L address mapping table 311 to become full, and performing the operation of Step S22 will not significantly decrease the overall performance. For another example, in the second loop comprising Steps S23-S25, the operation of Step S25 may need to process the P2L table entries corresponding to the size of 16 KB or 32 KB, and the operation of Step S24 may need to process the P2L table entries corresponding to the size of 1 KB or 2 KB only, where adding or inserting Step S24 before Step S25 in the second loop comprising Steps S23-S25 may merely increase 1-KB or 2-KB overhead regarding processing the P2L table entries. In a second case, the memory device 100 (e.g., the memory controller 110) may start receiving the first data (e.g., any data belonging to the cold data, any data belonging to the hot data and classified as sequential data as determined in Step S12, and any data belonging to the hot data and classified as non-sequential data as determined in Step S12 and further classified as having a previous version thereof at the same LBA in the hybrid active block 320 as determined in Step S14) with the hybrid active block 320 in Step S16 and record the aforementioned at least one P2L table entry into the temporary P2L address mapping table 310 corresponding to the hybrid active block 320 in Step S17 to cause the temporary P2L address mapping table 310 to become full, and performing the operations of Steps S24 and S25 will not significantly decrease the overall performance. As the data amount of the first data may be quite large and much greater than the size of 16 KB or 32 KB, the processing time of Steps S24 and S25 may be relatively short (e.g., the operations of Steps S24 and S25 may seem to be performed in the background). Additionally, the size of the temporary P2L address mapping table 310 corresponding to the hybrid active block 320 may be large enough for the memory device 100 (e.g., the memory controller 110) to greatly reduce the number of times of occurrence of the second case. For brevity, similar descriptions for these embodiments are not repeated in detail here.

According to some embodiments, as all data in the hybrid active block 320 should be the latest data, and as most data from the host device 50 should be received with the hybrid active block 320 by the memory device 100 (e.g., the memory controller 110), the memory device 100 (e.g., the memory controller 110) operating according to the method can greatly reduce the GC loading of the GC procedure. For brevity, similar descriptions for these embodiments are not repeated in detail here.

Figure 6B:
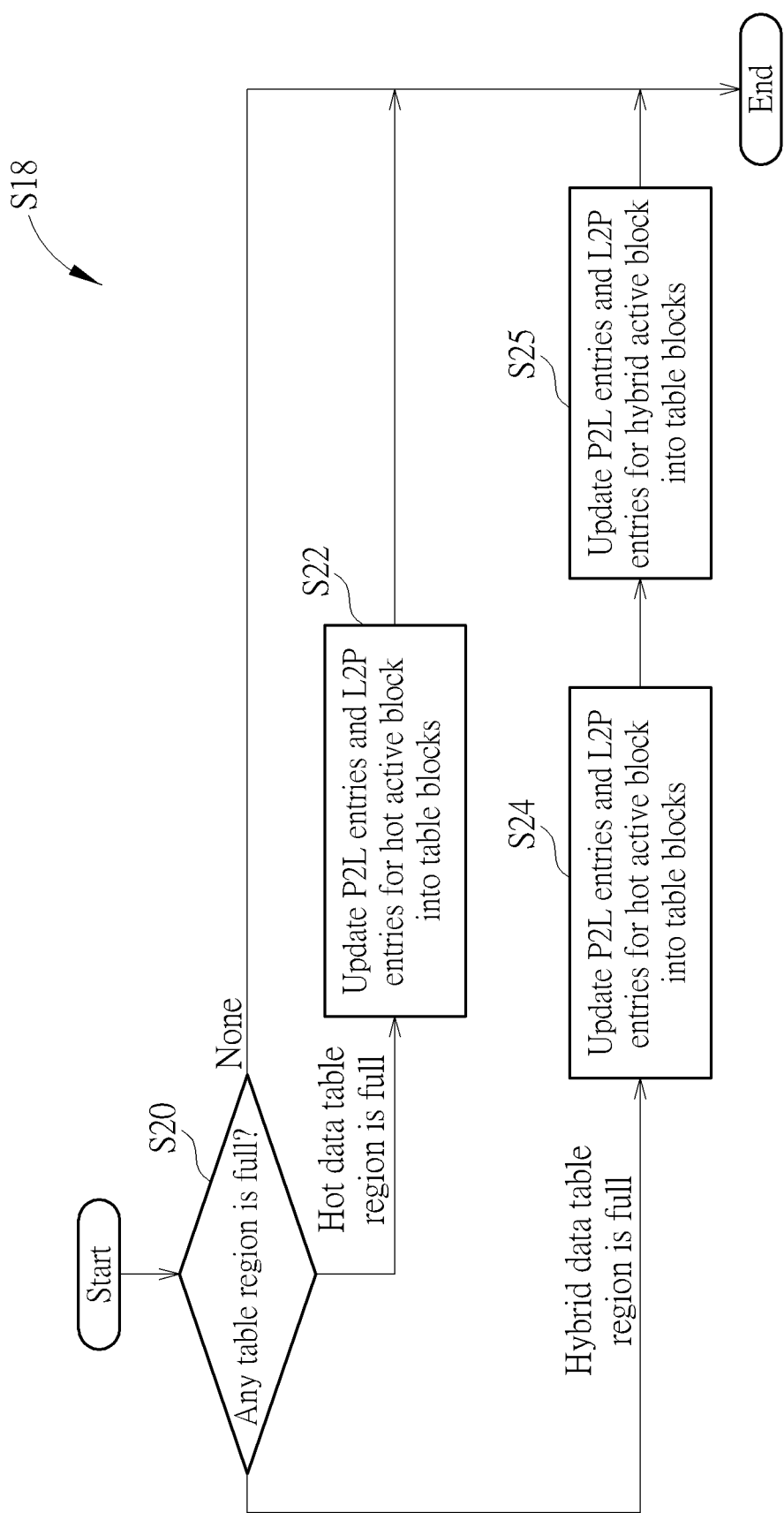
FIG. 6B illustrates some implementation details of the working flow shown in FIG. 5 according to another embodiment of the present invention.

FIG. 6B illustrates some implementation details of the working flow shown in FIG. 5 according to another embodiment of the present invention. For example, Step S18 of the working flow shown in FIG. 5 may comprise the multiple sub-steps such as Steps S20, S22, S24 and S25 of the working flow shown in FIG. 6B, where the operations of Steps S22, S24 and S25 shown in FIG. 6B may be the same as that of Steps S22, S24 and S25 shown in FIG. 6A.

In Step S20, the memory device 100 (e.g., the memory controller 110) may determine whether the table region of any temporary P2L address mapping table among the temporary P2L address mapping table 311 corresponding to the hot active block 321 and the temporary P2L address mapping table 310 corresponding to the hybrid active block 320 is full (labeled "Any table region is full" for brevity). If the table region 311R of the temporary P2L address mapping table 311 corresponding to the hot active block 321 is full (labeled "Hot data table region is full" for brevity), Step S22 is entered; if the table region 310R of the temporary P2L address mapping table 310 corresponding to the hybrid active block 320 is full (labeled "Hybrid data table region is full" for brevity), Step S24 is entered; if none of the table region 311R of the temporary P2L address mapping table 311 corresponding to the hot active block 321 and the table region 310R of the temporary P2L address mapping table 310 corresponding to the hybrid active block 320 is full, the working flow shown in FIG. 6B comes to the end. For brevity, similar descriptions for this embodiment are not repeated in detail here.

Figure 7:
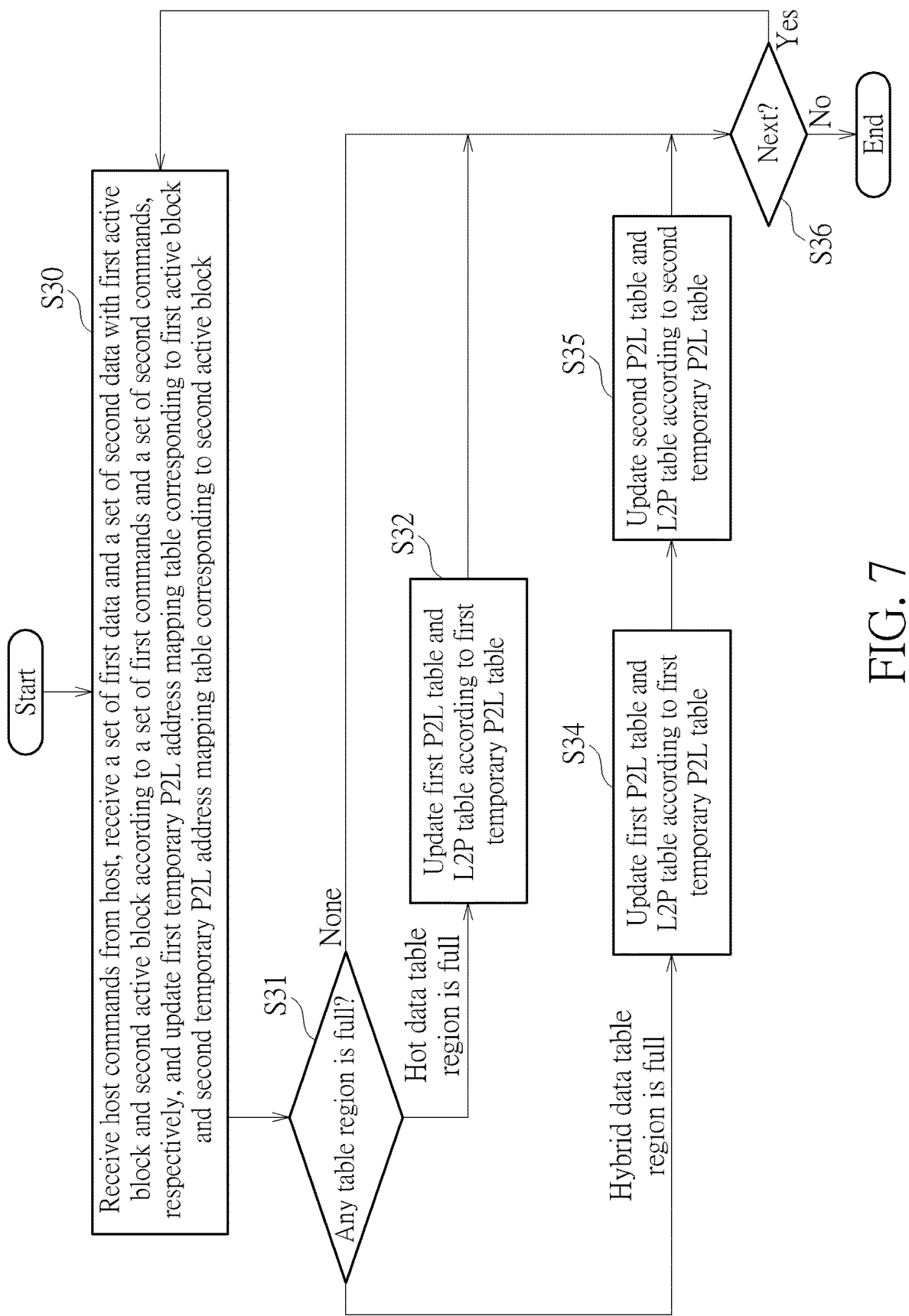
FIG. 7 illustrates a working flow of the method according to another embodiment of the present invention.

FIG. 7 illustrates a working flow of the method according to another embodiment of the present invention.

In Step S30, the memory device 100 (e.g., the memory controller 110) may receive host commands such as the plurality of host commands from the host device 50 through the transmission interface circuit 118 of the memory controller 110, receive a set of first data and a set of second data with a first active block (e.g., the hot active block 321) and a second active block (e.g., the hybrid active block 320) among the plurality of blocks according to a set of first commands and a set of second commands among the plurality of host commands, respectively, and update a first temporary P2L address mapping table corresponding to the first active block and a second temporary P2L address mapping table corresponding to the second active block, such as the temporary P2L address mapping table 311 corresponding to the hot active block 321 and the temporary P2L address mapping table 310 corresponding to the hybrid active block 320, where the set of first commands and the set of second commands may indicate that writing the set of first data into the memory device 100 and writing the set of second data into the memory device 100 are requested, respectively. As a result, the set of first data may be written into the first active block (e.g., the hot active block 321), and the set of second data may be written into the second active block (e.g., the hybrid active block 320). For example, any data among the set of first data and the set of second data may be classified to belong to the hot data or the cold data, and the hot data and the cold data represent the frequently accessed data and the infrequently accessed data, respectively.

In Step S31, the memory device 100 (e.g., the memory controller 110) may determine whether the table region of any temporary P2L address mapping table among the first temporary P2L address mapping table and the second temporary P2L address mapping table, such as any temporary P2L table among the temporary P2L address mapping table 311 corresponding to the hot active block 321 and the temporary P2L address mapping table 310 corresponding to the hybrid active block 320, is full (labeled "Any table region is full" for brevity). For example, if the table region 311R of the temporary P2L address mapping table 311 corresponding to the hot active block 321 is full (labeled "Hot data table region is full" for brevity), Step S32 is entered; if the table region 310R of the temporary P2L address mapping table 310 corresponding to the hybrid active block 320 is full (labeled "Hybrid data table region is full" for brevity), Step S34 is entered; and if none of the table region 311R of the temporary P2L address mapping table 311 corresponding to the hot active block 321 and the table region 310R of the temporary P2L address mapping table 310 corresponding to the hybrid active block 320 is full, Step S36 is entered.

In response to the table region of the aforementioned any temporary P2L address mapping table among the first temporary P2L address mapping table and the second temporary P2L address mapping table (e.g., the temporary P2L address mapping tables 311 and 310) being full, the memory device 100 (e.g., the memory controller 110) may update a first P2L address mapping table (e.g., the P2L address mapping table T21) in the NV memory 120 according to the first temporary P2L address mapping table (e.g., the temporary P2L address mapping table 311) and selectively update a second P2L address mapping table (e.g., the P2L address mapping table T20) in the NV memory 120 according to the second temporary P2L address mapping table (e.g., the temporary P2L address mapping table 310), for performing the subsequent processing mentioned above such as the GC procedure. The first temporary P2L address mapping table and the second temporary P2L address mapping table may be arranged to occupy a first table region (e.g., the table region 311R of the temporary P2L address mapping table 311) of a first size and a second table region (e.g., the table region 310R of the temporary P2L address mapping table 310) of a second size in the RAM 116 within the memory controller 110, respectively, where the first table region is typically smaller than the second table region.

According to whether the aforementioned any temporary P2L address mapping table is the first temporary P2L address mapping table (e.g., the temporary P2L address mapping table 311) or the second temporary P2L address mapping table (e.g., the temporary P2L address mapping table 310), the memory device 100 (e.g., the memory controller 110) may determine whether to skip updating the second P2L address mapping table (e.g., the P2L address mapping table T20) and the aforementioned at least one L2P address mapping table (e.g., the global L2P address mapping table 120T) according to the second temporary P2L address mapping table. Under control of the memory controller 110, if the aforementioned any temporary P2L address mapping table is the first temporary P2L address mapping table such as the temporary P2L address mapping table 311, updating the second P2L address mapping table and the aforementioned at least one L2P address mapping table according to the second temporary P2L address mapping table is skipped; and if the aforementioned any temporary P2L address mapping table is the second temporary P2L address mapping table, updating the second P2L address mapping table and the aforementioned at least one L2P address mapping table according to the second temporary P2L address mapping table is not skipped.

In Step S32, when the table region 311R of the temporary P2L address mapping table 311 corresponding to the hot active block 321 is full (labeled "Hot data table region is full" for brevity), the memory device 100 (e.g., the memory controller 110) may update the first P2L address mapping table such as the P2L address mapping table T21 and the aforementioned at least one L2P address mapping table such as the global L2P address mapping table 120T (labeled "first P2L table and L2P table" for brevity) in the NV memory 120 according to the first temporary P2L address mapping table such as the temporary P2L address mapping table 311 (labeled "first temporary P2L table" for brevity), without updating the second P2L address mapping table (e.g., the P2L address mapping table T20) as illustrated with the partial working flow from Step S32 to Step S36, for performing the subsequent processing mentioned above such as the GC procedure, data reading, etc.

In Step S34, when the table region 310R of the temporary P2L address mapping table 310 corresponding to the hybrid active block 320 is full (labeled "Hybrid data table region is full" for brevity), the memory device 100 (e.g., the memory controller 110) may update the first P2L address mapping table such as the P2L address mapping table T21 and the aforementioned at least one L2P address mapping table such as the global L2P address mapping table 120T (labeled "first P2L table and L2P table" for brevity) in the NV memory 120 according to the first temporary P2L address mapping table such as the temporary P2L address mapping table 311 (labeled "first temporary P2L table" for brevity).

In Step S35, after updating the first P2L address mapping table such as the P2L address mapping table T21 and the aforementioned at least one L2P address mapping table such as the global L2P address mapping table 120T as illustrated with Step S34, the memory device 100 (e.g., the memory controller 110) may update the second P2L address mapping table such as the P2L address mapping table T20 and the aforementioned at least one L2P address mapping table such as the global L2P address mapping table 120T (labeled "second P2L table and L2P table" for brevity) in the NV memory 120 according to the second temporary P2L address mapping table such as the temporary P2L address mapping table 310 (labeled "second temporary P2L table" for brevity), for performing the subsequent processing mentioned above such as the GC procedure, data reading, etc.

In Step S36, the memory device 100 (e.g., the memory controller 110) may determine whether to perform a next operation, for example, according to whether there is sufficient storage space within the data region of the NV memory 120. If Yes (e.g., there is sufficient storage space within the data region of the NV memory 120), Step S30 is entered; if No (e.g., there is no sufficient storage space within the data region of the NV memory 120), the working flow shown in FIG. 7 comes to the end.

For better comprehension, the method may be illustrated with the working flow shown in FIG. 7, but the present invention is not limited thereto. According to some embodiments, one or more steps may be added, deleted, or changed in the working flow shown in FIG. 7. For example, the operation of Step S30 may comprise at least one portion of operations (e.g., a portion of operations or all operations) among the operations of the partial working flows starting from Step S10 and reaching Step S17 in the working flow shown in FIG. 5, and may be regarded as the result of executing Steps S10 and S11 as well as one or more subsequent steps such as Step S12, Steps S13 and S14, Step S15 and/or Step S16 and then executing Step S17 in multiple iterations of the working flow shown in FIG. 5. More particularly, the commands {CMD} of Step S10 in the multiple iterations of the working flow shown in FIG. 5 may comprise at least one first command (e.g., one or more first commands) and at least one second command (e.g., one or more second commands), which can be taken as examples of the set of first commands and the set of second commands in Step S30, respectively. After executing Steps S10, S11, etc. in the multiple iterations of the working flow shown in FIG. 5, the memory device 100 (e.g., the memory controller 110) may have received the set of first data and the set of second data with the first active block (e.g., the hot active block 321) and the second active block (e.g., the hybrid active block 320) according to the set of first commands such as the aforementioned at least one first command and the set of second commands such as the aforementioned at least one second command, respectively, and may have updated the first temporary P2L address mapping table and the second temporary P2L address mapping table (e.g., the temporary P2L address mapping tables 311 and 310) correspondingly. Additionally, the operations of Steps S32, S34 and S35 may comprise the operations of Steps S22, S24 and S25, respectively. For brevity, similar descriptions for these embodiments are not repeated in detail here.

According to some embodiments, the memory device 100 (e.g., the memory controller 110) may determine the selected active block among the multiple active blocks according to the aforementioned at least one predetermined rule. Based on a certain predetermined rule among the aforementioned at least one predetermined rule, when the first data belongs to the cold data, the memory device 100 (e.g., the memory controller 110) is arranged to receive and store the first data with the hybrid active block 320, where the memory controller 110 may determine whether the first data belongs to the cold data according to the first information (e.g., the first data length and/or the first indication). In addition, determining the selected active block among the multiple active blocks (e.g., the hybrid active block 320 and the hot active block 321) according to the aforementioned at least one predetermined rule may comprise selectively performing at least one checking operation (e.g., one or more checking operations) on the first information (e.g., the aforementioned at least one first logical address, the first data length and/or the first indication) to generate at least one determination result (e.g., one or more determination results), for determining the selected active block among the multiple active blocks. For example, the aforementioned at least one checking operation may comprise the first checking operation (e.g., the operation of Step S11), and may further comprise the aforementioned at least one other checking operation such as the second checking operation (e.g., the operation of Step S12) and the third checking operation (e.g., the operation of Step S14), where the aforementioned at least one determination result may comprise the first determination result, and may further comprise the aforementioned at least one other determination result such as the second determination result and the third determination result. For brevity, similar descriptions for these embodiments are not repeated in detail here.

According to some embodiments, any command (e.g., the command CMD) among the set of first commands and the set of second commands may carry first information related to any data (e.g., the first data) to be written. More particularly, the first data mentioned in the associated operations of the embodiment shown in FIG. 5 may be taken as an example of the aforementioned any data. The first information related to the aforementioned any data (e.g., the first data) may comprise at least one first logical address for indicating at least one first logical address region, where the aforementioned any command may indicate that writing the aforementioned any data (e.g., the first data) into the at least one first logical address region is requested. In addition, the memory device 100 (e.g., the memory controller 110) may perform the aforementioned at least one checking operation on the first information related to the aforementioned any data (e.g., the first data) in order to generate the aforementioned at least one determination result, for determining the selected active block for receiving the aforementioned any data among the first active block (e.g., the hot active block 321) and the second active block (e.g., the hybrid active block 320) according to the aforementioned at least one determination result. For brevity, similar descriptions for these embodiments are not repeated in detail here.

According to some embodiments, the aforementioned any data (e.g., the first data) may be classified as the hot data in Step S10. For example, the aforementioned at least one other checking operation among the aforementioned at least one checking operation may be selectively performed on the first information related to the aforementioned any data (e.g., the first data) in order to generate the aforementioned at least one other determination result among the aforementioned at least one determination result, for determining the selected active block among the first active block and the second active block, where the aforementioned at least one other determination result may indicate whether the aforementioned any data (e.g., the first data) classified as the hot data belongs to the first portion of the hot data or the other portion of the hot data. More particularly, if the aforementioned at least one other determination result indicates that the aforementioned any data (e.g., the first data) classified as the hot data belongs to the other portion of the hot data, the memory device 100 (e.g., the memory controller 110) may receive the aforementioned any data with the hybrid active block 320 (rather than the hot active block 321) in Step S16; and if the aforementioned at least one other determination result indicates that the aforementioned any data (e.g., the first data) classified as the hot data belongs to the first portion of the hot data, the memory device 100 (e.g., the memory controller 110) may receive the aforementioned any data with the hot active block 321 (rather than the hybrid active block 320) in Step S15. For example, the aforementioned at least one other checking operation may comprise the second checking operation (e.g., the operation of Step S12) and the third checking operation (e.g., the operation of Step S14), where the second determination result may indicate whether the aforementioned any data (e.g., the first data) is sequential data, and the third determination result may indicate whether the same logical address among the at least one first logical address is found in the second temporary P2L address mapping table (e.g., the temporary P2L address mapping table 310). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access management of a memory device in a predetermined communications architecture with aid of unbalanced table update, the method being applied to a memory controller of the memory device, the memory device comprising the memory controller and a non-volatile (NV) memory, the NV memory comprising at least one NV memory element, the at least one NV memory element comprising a plurality of blocks, the method comprising:

utilizing the memory controller to receive a plurality of host commands from a host device through a transmission interface circuit of the memory controller, receive a set of first data and a set of second data with a first active block and a second active block among the plurality of blocks according to a set of first commands and a set of second commands among the plurality of host commands, respectively, and update a first temporary physical-to-logical (P2L) address mapping table corresponding to the first active block and a second temporary P2L address mapping table corresponding to the second active block, wherein the set of first commands and the set of second commands indicate that writing the set of first data into the memory device and writing the set of second data into the memory device are requested, respectively; and in response to a table region of any temporary P2L address mapping table among the first temporary P2L address mapping table and the second temporary P2L address mapping table being full, updating a first P2L address mapping table in the NV memory according to the first temporary P2L address mapping table and selectively updating a second P2L address mapping table in the NV memory according to the second temporary P2L address mapping table, for performing subsequent processing, wherein the first temporary P2L address mapping table and the second temporary P2L address mapping table are arranged to occupy a first table region of a first size and a second table region of a second size in a Random Access Memory (RAM) within the memory controller, respectively.

2. The method of claim 1, wherein any data among the set of first data and the set of second data is classified to belong to hot data or cold data, and the hot data and the cold data represent frequently accessed data and infrequently accessed data, respectively; and the second active block and the first active block represent a hybrid active block and a hot active block, respectively, for receiving hybrid data and a first portion of the hot data, respectively, wherein the hybrid data comprises the cold data and another portion of the hot data.

3. The method of claim 1, wherein whether to skip updating the second P2L address mapping table according to the second temporary P2L address mapping table is determined according to whether the any temporary P2L address mapping table is the first temporary P2L address mapping table or the second temporary P2L address mapping table.

4. The method of claim 3, wherein:

if the any temporary P2L address mapping table is the first temporary P2L address mapping table, updating the second P2L address mapping table according to the second temporary P2L address mapping table is skipped; and if the any temporary P2L address mapping table is the second temporary P2L address mapping table, updating the second P2L address mapping table according to the second temporary P2L address mapping table is not skipped.

5. The method of claim 3, wherein updating the first P2L address mapping table in the NV memory according to the first temporary P2L address mapping table and selectively updating the second P2L address mapping table in the NV memory according to the second temporary P2L address mapping table for performing the subsequent processing further comprises:

in response to the first table region of the first temporary P2L address mapping table being full, updating the first P2L address mapping table in the NV memory according to the first temporary P2L address mapping table without updating the second P2L address mapping table, for performing the subsequent processing.

6. The method of claim 3, wherein updating the first P2L address mapping table in the NV memory according to the first temporary P2L address mapping table and selectively updating the second P2L address mapping table in the NV memory according to the second temporary P2L address mapping table for performing the subsequent processing further comprises:

in response to the second table region of the second temporary P2L address mapping table being full, updating the first P2L address mapping table in the NV memory according to the first temporary P2L address mapping table, and updating the second P2L address mapping table in the NV memory according to the second temporary P2L address mapping table afterward, for performing the subsequent processing.

7. The method of claim 1, wherein updating the first P2L address mapping table in the NV memory according to the first temporary P2L address mapping table and selectively updating the second P2L address mapping table in the NV memory according to the second temporary P2L address mapping table for performing the subsequent processing further comprises:

updating the first P2L address mapping table and at least one logical-to-physical (L2P) address mapping table in the NV memory according to the first temporary P2L address mapping table and selectively updating the second P2L address mapping table and the at least one L2P address mapping table in the NV memory according to the second temporary P2L address mapping table, for performing the subsequent processing.

8. The method of claim 1, wherein any command among the set of first commands and the set of second commands carries first information related to any data to be written, the first information comprises at least one first logical address for indicating at least one first logical address region, and the any command indicates that writing the any data into the at least one first logical address region is requested; and the method further comprises:
performing at least one checking operation on the first information to generate at least one determination result, for determining a selected active block for receiving the any data among the first active block and the second active block according to the at least one determination result, wherein a first checking operation among the at least one checking operation is performed on the first information to generate a first determination result among the at least one determination result, for indicating whether the any data belongs to hot data or cold data, and the hot data and the cold data represent frequently accessed data and infrequently accessed data, respectively, wherein the second active block and the first active block represent a hybrid active block and a hot active block, respectively, for receiving hybrid data and a first portion of the hot data, respectively, and the hybrid data comprises the cold data and another portion of the hot data.

9. The method of claim 8, wherein the any data is classified as the hot data; and at least one other checking operation among the at least one checking operation is selectively performed on the first information to generate at least one other determination result among the at least one determination result, for determining the selected active block among the first active block and the second active block, wherein the at least one other determination result indicates whether the any data classified as the hot data belongs to the first portion of the hot data or the other portion of the hot data.

10. The method of claim 9, wherein if the at least one other determination result indicates that the any data classified as the hot data belongs to the other portion of the hot data, the any data is received with the hybrid active block, rather than being received with the hot active block; and if the at least one other determination result indicates that the any data classified as the hot data belongs to the first portion of the hot data, the any data is received with the hot active block, rather than being received with the hybrid active block.

11. The method of claim 9, wherein the at least one other checking operation comprises a second checking operation, and the at least one other determination result comprises a second determination result obtained from performing the second checking operation, wherein the second determination result indicates whether the any data is sequential data.

12. The method of claim 11, wherein the at least one other checking operation further comprises a third checking operation, and the at least one other determination result further comprises a third determination result obtained from performing the third checking operation, wherein the third determination result indicates whether a same logical address among the at least one first logical address is found in the second temporary P2L address mapping table.

13. The method of claim 1, wherein after any active block among the first active block and the second active block is fully programmed, the any active block becomes an inactive block; and the subsequent processing comprises performing a garbage collection (GC) procedure to write valid data among all data in the inactive block into a blank block.

14. The method of claim 1, wherein the first table region is smaller than the second table region.

15. A memory controller of a memory device, the memory device comprising the memory controller and a non-volatile (NV) memory, the NV memory comprising at least one NV memory element, the at least one NV memory element comprising a plurality of blocks, the memory controller comprising:
a processing circuit, arranged to control the memory controller according to a plurality of host commands from a host device, to allow the host device to access the NV memory through the memory controller, wherein the processing circuit is arranged to perform data access management of the memory device in a predetermined communications architecture with aid of unbalanced table update; and
a transmission interface circuit, arranged to perform communications with the host device;
wherein:
the memory controller receives the plurality of host commands from the host device through the transmission interface circuit of the memory controller, receives a set of first data and a set of second data with a first active block and a second active block among the plurality of blocks according to a set of first commands and a set of second commands among the plurality of host commands, respectively, and updates a first temporary physical-to-logical (P2L) address mapping table corresponding to the first active block and a second temporary P2L address mapping table corresponding to the second active block, wherein the set of first commands and the set of second commands indicate that writing the set of first data into the memory device and writing the set of second data into the memory device are requested, respectively; and
in response to a table region of any temporary P2L address mapping table among the first temporary P2L address mapping table and the second temporary P2L address mapping table being full, the memory controller updates a first P2L address mapping table in the NV memory according to the first temporary P2L address mapping table and selectively updates a second P2L address mapping table in the NV memory according to the second temporary P2L address mapping table, for performing subsequent processing, wherein the first temporary P2L address mapping table and the second temporary P2L address mapping table are arranged to occupy a first table region of a first size and a second table region of a second size in a Random Access Memory (RAM) within the memory controller, respectively.

16. The memory device comprising the memory controller of claim 15, wherein the memory device comprises:
the NV memory, configured to store information; and
the memory controller, coupled to the NV memory, configured to control operations of the memory device.

17. An electronic device comprising the memory device of claim 16, and further comprising:

the host device, coupled to the memory device, wherein the host device comprises:
    at least one processor, arranged for controlling operations of the host device; and
    a power supply circuit, coupled to the at least one processor, arranged for providing power to the at least one processor and the memory device;
wherein the memory device provides the host device with storage space.

* * * * *